UNITED STATES PATENT OFFICE.

JOHN H. KELLOGG, OF BATTLE CREEK, MICHIGAN.

CEREAL COFFEE OR COFFEE SUBSTITUTE.

1,069,268.   Specification of Letters Patent.   Patented Aug. 5, 1913.

No Drawing.   Original application filed May 20, 1912, Serial No. 698,585. Divided and this application filed June 23, 1913. Serial No. 775,232.

*To all whom it may concern:*

Be it known that I, JOHN H. KELLOGG, a citizen of the United States, and a resident of the city of Battle Creek, in the county of Calhoun and State of Michigan, have invented certain new and useful Improvements in Cereal Coffee or Coffee Substitute, of which the following is a specification.

This invention relates to improvements in cereal coffee or coffee substitutes and constitutes a division of my prior application, Serial No. 698,585, filed May 20, 1912.

One of the primary objects of the invention is the provision of a cereal coffee which may be readily and cheaply manufactured and which may be prepared for immediate use merely by adding hot water to the preparation.

Another object is to utilize the residue from which the soluble extract has been removed as a carrier to receive upon the surfaces of its composite granules the concentrated extract previously removed.

Other objects and advantages of the invention will be readily appreciated as the invention is better understood from the following description and the appended claims:

In carrying out my invention I prefer to employ a cereal coffee produced by combining malted cereals such for instance as malted wheat, barley, or rye, and barley sprouts, with bran and unmalted wheat, rye and barley, and roasting the whole together. It should be understood, however, that the above mentioned constituents are merely illustrative and that the term cereal coffee hereinafter employed may comprehend any of the so called cereal coffees now on the market or other preferred materials, or compositions of similar character.

The cereal coffee employed is first thoroughly roasted or baked and then boiled to extract the soluble matter, the boiling being carried on for a limited period of time, preferably from one-half hour to one hour according to variations in conditions. It is however, desirable to boil the mixture until substantially all of the soluble matter has been extracted therefrom. The extract or liquor is then drained or otherwise separated from the insoluble grains or solid residue, which is usually in the form of a granular mass, and is then concentrated or evaporated to a syrup-like consistency.

The insoluble grains or grounds from which the extract has been removed are first dried and then approximately one-half of this insoluble residue is mixed with the concentrated extract or syrup, so that the exteriors of the insoluble granules are thoroughly coated with the extract, the mass being then thoroughly dried to fix the coating of extract. If desired, the material may be coarsely ground to separate particles which may have adhered together during the drying.

It will be manifest that the extract is thoroughly mixed with the insoluble granular residue so that the surfaces of the grounds or granules are coated with the extract which is in soluble form and readily accessible, so that it will be dissolved at once from the granules when brought into contact with boiling water. Sugar in any desired quantities may be added to the extract before the same is applied to the granules so that the beverage resulting from the addition of boiling water will possess the desired degree of sweetness.

It will be obvious that since the condensed or evaporated extract is carried on the surface of the insoluble grounds or granules it may be very readily and quickly dissolved by pouring hot water over the grounds with the result that a pleasing beverage may be prepared very quickly and easily. While the product is capable of use without drying I prefer, nevertheless, to thoroughly dry the coated grounds for the reason that when thoroughly dried the product may be kept for long period without spoiling.

I claim:

1. The process of manufacturing cereal coffee consisting of extracting the liquor from cereal coffee, evaporating the extract, and mixing cereal coffee grounds with the extract to coat the surfaces of said grounds.

2. The process of manufacturing cereal coffee consisting of boiling cereal coffee, extracting the liquor and evaporating it to a syrup-like consistency, and mixing cereal coffee grounds with the extract to coat the surfaces of the grounds with the extract.

3. The process of manufacturing cereal coffee which consists in extracting the soluble part of cereal coffee by steeping, separating the soluble from the insoluble matter, concentrating the soluble and drying the insoluble matter, and coating the dried insoluble matter with the concentrated soluble matter.

4. The process of manufacturing cereal coffee consisting in steeping cereal coffee and extracting the soluble constituents, concentrating the same by evaporation, drying the solid residue, admixing the parts to coat the dried mass with the concentrated extract, and drying the same.

5. A coffee substitute consisting of cereal coffee grounds or residue having a coating of cereal coffee liquor dried thereon.

6. A coffee substitute consisting of cereal coffee grounds or residue having a coating of concentrated cereal coffee liquor.

7. A cereal coffee substitute consisting of a granular mass of cereal coffee grounds coated with the concentrated soluble extract of cereal coffee dried thereon.

8. A cereal coffee substitute consisting of dried cereal coffee grounds in granular form coated with a concentrated soluble extract of cereal coffee dried thereon.

9. A coffee substitute consisting of a granular mass of the insoluble residue from a cereal coffee coated with a concentrated soluble extract of the coffee dried thereon.

10. A coffee substitute consisting of cereal coffee grounds or residue in granular form, the granules having a surface coating of cereal coffee liquor evaporated to a syrup-like consistency and dried thereon.

11. A coffee substitute consisting of cereal coffee grounds or residue in granular form, the granules having a surface coating of cereal coffee liquor evaporated to a syrup-like consistency.

JOHN H. KELLOGG.

Witnesses:
J. C. RIGGS,
S. B. TENNEY.